United States Patent [19]

Jakobi

[11] Patent Number: 5,040,450

[45] Date of Patent: Aug. 20, 1991

[54] TANDEM BRAKE BOOSTER CONTROL HOUSING WITH AXIALLY EXTENDING DUCTS

[75] Inventor: Ralf Jakobi, Liederbach, Fed. Rep. of Germany

[73] Assignee: Alfred Teves GmbH, Frankfurt am Main, Fed. Rep. of Germany

[21] Appl. No.: 277,580

[22] Filed: Nov. 29, 1988

[30] Foreign Application Priority Data

Dec. 24, 1987 [DE] Fed. Rep. of Germany ....... 3744012

[51] Int. Cl.⁵ .................... B60T 13/56; B60T 13/569
[52] U.S. Cl. ...................................... 91/376 R; 92/48
[58] Field of Search ...................... 92/48, 102, 49, 99, 92/111; 91/369.1, 369.2, 376 R

[56] References Cited

U.S. PATENT DOCUMENTS

| 3,603,208 | 9/1971 | Kytta | 91/376 R X |
|---|---|---|---|
| 4,069,742 | 1/1978 | Gephart et al. | 91/376 R |
| 4,173,172 | 11/1979 | Ohmi | 92/48 X |
| 4,512,237 | 4/1985 | Endoh et al. | 92/48 X |
| 4,587,884 | 5/1986 | Tsubouchi | 92/48 X |
| 4,596,178 | 6/1986 | Sugiura | 92/48 |
| 4,621,564 | 11/1986 | Nishii | 91/376 R |
| 4,729,289 | 3/1988 | Boehm | 92/48 X |
| 4,813,337 | 3/1989 | Endo | 92/48 X |

FOREIGN PATENT DOCUMENTS 3505626 8/1986 Fed. Rep. of Germany ..... 91/369.2

*Primary Examiner*—Edward K. Look
*Assistant Examiner*—George Kapsalas
*Attorney, Agent, or Firm*—Robert P. Seitter; J. Gordon Lewis

[57] ABSTRACT

In order to reduce the number of component parts required for the simultaneous ventilation of two power chambers of a tandem brake power booster and to avoid sealing problems. A booster, according to the invention, provides for the transmission of the boosting power of the master cylinder-side movable wall of the booster to be directly to the control housing.

10 Claims, 4 Drawing Sheets

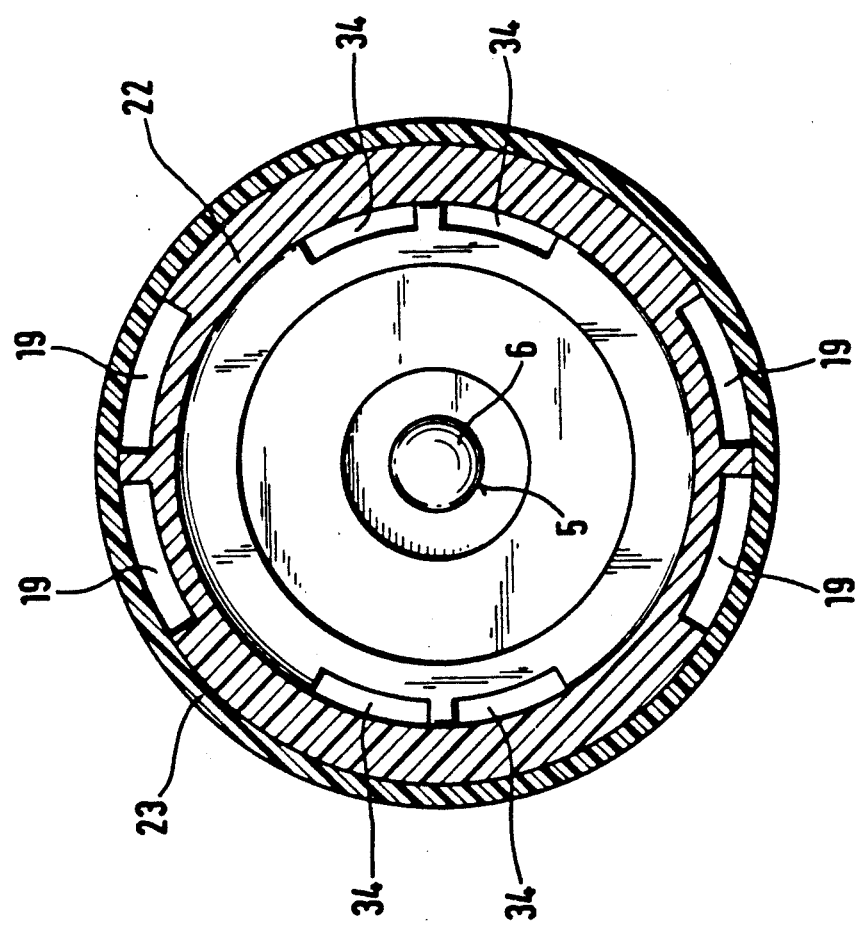

TANDEM BRAKE BOOSTER CONTROL HOUSING WITH AXIALLY EXTENDING DUCTS

BACKGROUND OF THE INVENTION

This invention is related to a tandem brake power booster for automotive vehicles of the type having a housing whose internal space is subdivided into a front and a rear booster chamber by means of a partition wall, a first and a second movable wall which subdivide the front and the rear booster chamber into a first vacuum chamber and a first power chamber and a second vacuum chamber and a second power chamber, respectively. A control housing is slidable in the direction of actuation and a valve device which is accommodated therein, is actuatable by means of an operating rod linked to a brake pedal and controls the passage of atmospheric air into the power chambers. A push rod interacts with the control housing and transmits the brake power to an actuating piston of a master cylinder secured to the housing. The vacuum chambers as well as the power chambers are connected to each other in a range which is located within their radially internal boundary.

A tandem brake power booster of this kind is known, for example, from the German patent application No. P 33 03 577, published without examination. The special feature of this brake power booster is that the link between the two power chambers is established by means of an annular clearance which is defined between a guide tube pushed onto the control housing and a metal sleeve fastened to the control housing concentrically with respect to the guide tube, whereas the vacuum chambers are connected to each other through vacuum ducts being formed out in the control housing and radially defined by the inner wall of the sleeve. In this configuration, the guide tube extends into the front power chamber and projects through a partition wall which subdivides the booster housing into two booster chambers and is sealed off against the guide tube by means of a sealing ring. The annular clearance is subdivided into individual ventilating ducts by a plurality of radial fins formed at the internal diameter and the anterior movable wall is in active connection with the control housing through the sleeve.

One shortcoming of the forementioned tandem brake power booster is the necessity to utilize a plurality of components for the simultaneous ventilation of the power chambers which causes considerable problems with regard to their sealing, particularly in the range of the partition wall on the surface of the guide tube and of the two O-rings which seal off the sleeve against the control housing.

SUMMARY OF THE INVENTION

It is, therefore, the object of the present invention to provide for a tandem brake power booster of this general kind in which a major functional improvement is achieved and the above-mentioned disadvantages are avoided.

Now, it has proved that the aforesaid object is achieved in a surprisingly simple and technically advanced manner by a tandem brake power booster in which the booster power of the first movable wall is transmitted directly to the control housing. A tandem brake power booster for automotive vehicles is, thus, created in which reliability in operation is considerably increased and low-cost component parts are utilized. At the same time, its design is simplified considerably and its weight reduced.

According to an advantageous embodiment of the invention, the first movable wall is arranged at an axial extension of the control housing which projects through the partition wall and extends into the first booster chamber. This structure provides for locating the poppet valve in the internal space of the booster housing, whereby it becomes possible to optimize the length of the atmosphere paths.

In a further advantageous embodiment of the object of the invention, the connection link of the first and of the second vacuum chamber as well as the link of the two power chambers are achieved by means of vacuum, and ventilating ducts formed in the control housing. Since these ducts run in an axial direction, they allow transverse slide valves to be formed into the control housing which offers the possibility of giving them an optimum design.

A perfect sealing of the partition wall with respect to the control housing is obtained by the ventilating ducts which are provided in the control housing in the shape of axial grooves and are defined in the radial direction by means of a sealing sleeve which is sealedly positioned on the extension of the control housing.

According to another embodiment of the invention the second movable wall is arranged at the control housing snugly adhering to the sealing sleeve so that its boosting power is transmitted to the control housing through the sealing sleeve. For this purpose, the sealing sleeve is provided with a collar which interacts with an annular surface provided at the control housing.

BRIEF DESCRIPTION OF THE DRAWING

Further details and advantages of the tandem brake power booster according to the invention will be understood from the following Detailed Description of a Preferred Embodiment of the invention in conjunction with the accompanying drawing wherein identical parts have been given identical reference symbols and:

FIG. 4 is a cross section taken along the line A—A in FIG. 3 showing details of construction.

DETAILED DESCRIPTION OF A PREFERRED EMBODIMENT

Figure 1:
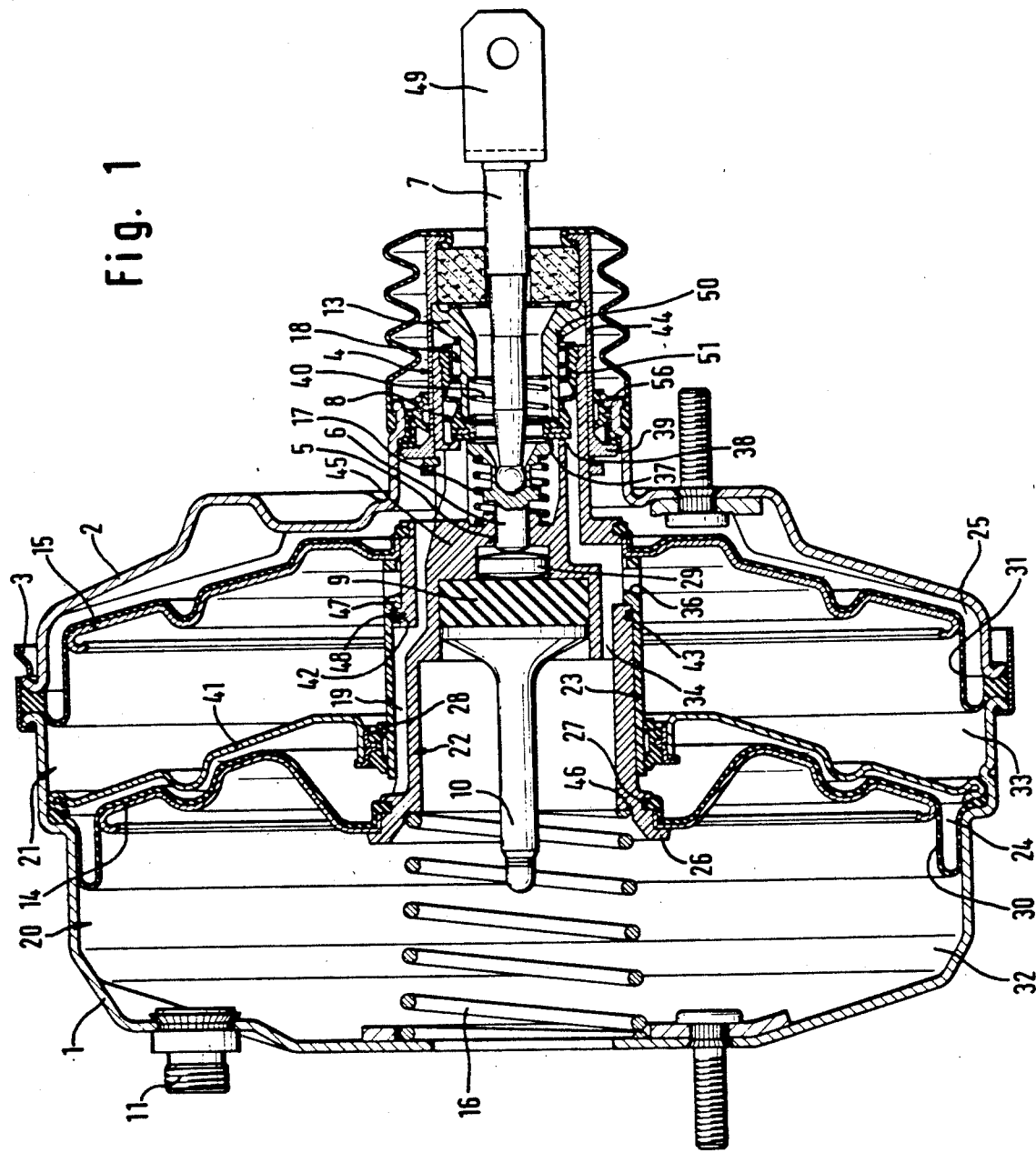
FIG. 1 is a longitudinal partial cross section of a first embodiment of the tandem brake power booster according to the invention showing details of construction.
Figure 3:
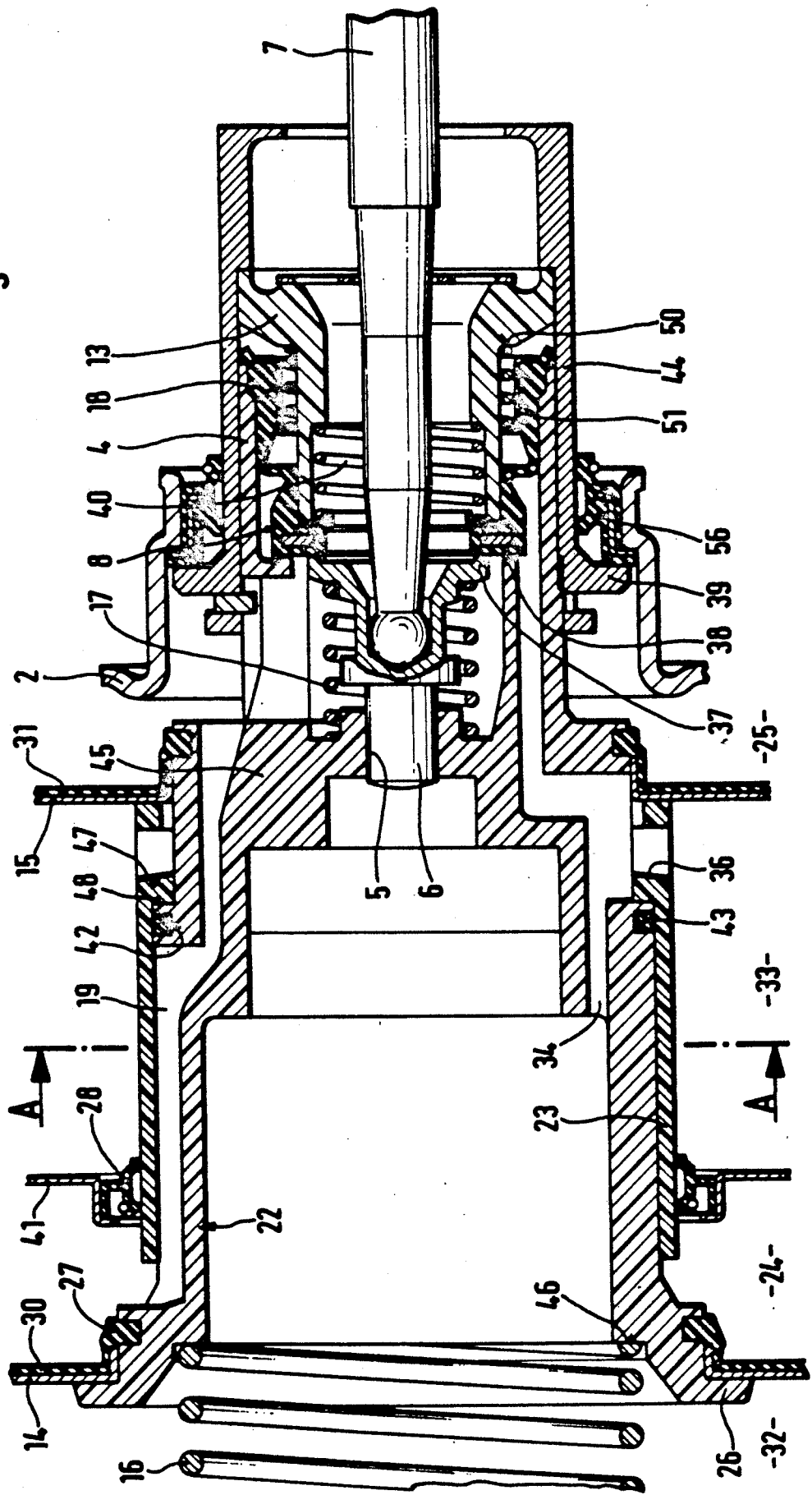
FIG. 3 is an enlarged longitudinal cross section of the control housing of the tandem brake power booster according to FIG. 1 showing further details of construction.

The tandem brake power booster shown in FIGS. 1, 3 and 4 includes a housing which is formed by two cup-shaped housing halves 1, 2 held together by means of a locking ring 3. The internal space of the housing is subdivided by means of a partition wall 41 located therein in a sealed manner into an anterior (master cylinder-side) booster chamber 20 and a rear (brake pedal-side) booster chamber 21, the anterior booster chamber 20 is subdivided by a first movable wall 14 into a first vacuum chamber 32 having a constant pressure and a first power chamber 24 having variable pressure and the rear booster chamber 21 subdivided by a second movable wall 15 into a second vacuum chamber 33 and a second power chamber 25. The front housing half 1 is provided with a vacuum connection 11 by means of which the first vacuum chamber 32 is connected to a suitable vacuum source, for example, to the intake of the automotive vehicle engine.

A control housing 4 which is a two-part design including a guide section 44 and a front section 45 is guided in an axial section of smaller diameter of the rear housing half 2. In the internal space of the control housing 4, a control rod comprised of a piston rod 7 and a valve piston 6 is axially slidably accommodated and is connected, through a clevis 49, to a brake pedal of an automotive vehicle which is not shown in the drawing. The control housing 4 also includes a valve arrangement 8, 37, 38 which is actuated by the valve piston 6 and controls the pressure difference between the vacuum chambers 32, 33 and the power chambers 24, 25 through vacuum ducts 34 and ventilating ducts 19. The front section 45 of the control housing 4 including the second movable wall 15 is provided with an axial bore 5 in which the valve piston 6 is slidably guided and which extends into a section of larger diameter in which a transmission disc 29 is arranged which interacts with an elastometric reaction disc 9 connecting a push rod 10 which actuates a master cylinder not shown in the drawing.

Finally, at its master cylinder-side end, the front section 45 of the control housing 4 is provided with an axial extension 22 projecting out into the first vacuum chamber 32 and extending through the partition wall 41 and is sealed at the passage opening by means of a sealing ring 28. To restore the movable walls 14, 15, a return spring 16 is provided which is clamped in between the master cylinder-side housing half 1 and an annular surface 46 on the axial extension 22, at the front end of the extension. The first movable wall 14 is provided with a first rolling diaphragm 30 snugly adhering to it within the first power chamber 24 and straddling with its internal section the internal edge of the first movable wall 14 whereas its heel 27 seals off the movable wall 14 against the axial extension 22. In this configuration, the movable wall 14 is supported in the axial direction at a radial annular collar 26 which is provided at the extension 22 of the control housing 4.

The ventilating ducts 19 provided preferably in the form of axial grooves in the front section 45 of the control housing 4 are defined in the radially outward direction by means of a sealing sleeve 23 which is received on the axial extension 22 and whose collar 47 interacts with an annular surface 48 at the front section 45 of the control housing 4. In the immediate vicinity of the annular surface 48, the front section 45 is provided with a radial groove 42 which accommodates an O-ring 43 for sealing the sealing sleeve 23 against the front section 45. Preferably, the second movable wall 15 is arranged at the front section 45 of the control housing 4 such that a second rolling diaphragm 31 which straddles the internal edge of the second movable wall 15 is attached to the front section 45 of the control housing 4. The radially internal section of the movable wall 15 takes support in the axial direction at the sealing sleeve 23 so that transmission of the boosting power of the second movable wall 15 to the control housing 4 takes place through the sealing sleeve 23. The connection of the second vacuum chamber 33 with the vacuum ducts 34 provided in the front section 45 of the control housing 4 is by way of a plurality of passage openings 36 provided in the sealing sleeve 23 in the area of its control piston-side end.

The control unit of the vacuum brake power booster is shown in the release position, that is to say, in a position in which the two vacuum chambers 32, 33 are dissociated from the power chambers 24, 25. As a matter of fact, the two sealing seats 37, 38 are abutted in this position against the sealing area of the poppet valve 8 which presents a stop on its side facing away from the sealing area which butts against the guide section 44 through a sleeve 13. In the release position, the guide section 44 is abutted with its flanged collar 39 against a sliding guide ring 56 and the sealing seat 37 at the valve piston 6 is pressed by a piston rod return spring 17 against the sealing area of the poppet valve 8. The poppet valve 8 is simultaneously pre-tensioned in the direction of the two sealing seats 37, 38 by means of a compression spring 40 which takes support at the sleeve 13 with its other end. In addition, a second compression spring 18 is provided which takes support at a guide 51 of the poppet valve 8 on one side and at a ring-shaped surface 50 of the sleeve 13 on the other side and which keeps the two control housing sections 44, 45 separated.

Figure 2:
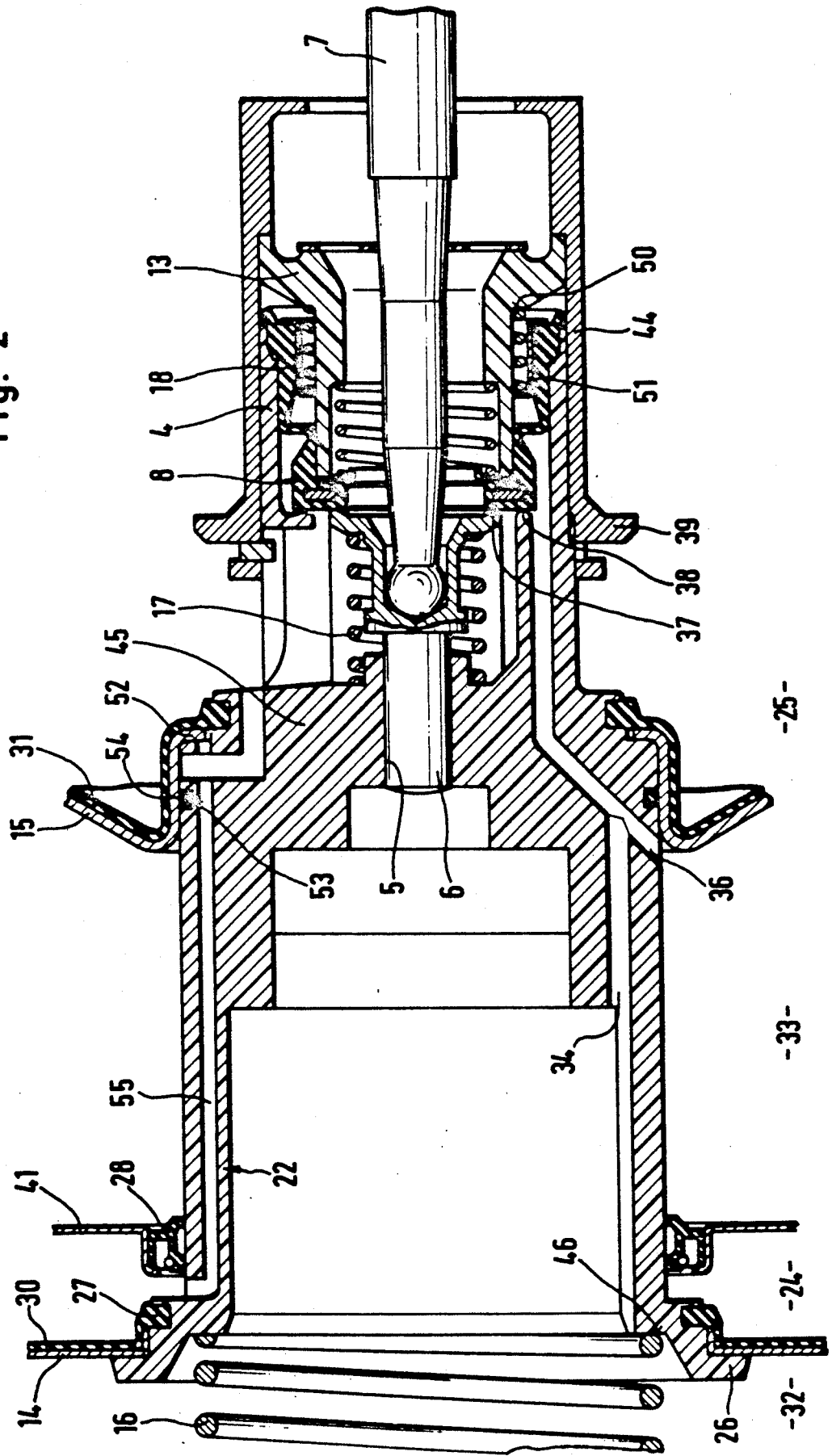
FIG. 2 is an enlarged axial cross-section of a second embodiment of the control housing of the tandem brake power booster according to the invention showing details of construction.

In the embodiment of the inventive tandem brake power booster illustrated in FIG. 2, the ventilating ducts 19 are detailed by axial passages 55 provided in the axial extension 22 and in the front section 45 of the control housing 4. The boosting power is transmitted directly to the front section 45 of the control housing 4, by means of an annular surface 52 which is provided at the second movable wall 15 which extends radially inwardly and is supported in the axial direction in the area of fixation of the second movable wall 15, directly at the front section 45 of the control housing 4. Sealing of the second vacuum chamber 33 with respect to the ventilating ducts 19 is effected by means of a sealing ring 54 which is positioned in an annular groove 53 provided in the surface of the front section 45.

What is claimed is:
1. A tandem brake power booster for automotive vehicles comprising:
   a housing enclosing an internal space;
   a partition wall within said housing subdividing said internal space into a front booster chamber and a rear booster chamber;
   a first movable wall within said housing subdividing said front booster chamber into a first vacuum chamber and a first power chamber;
   a second movable wall within said housing subdividing said rear booster chamber into a second vacuum chamber and a second power chamber;
   fluid flow means for placing said first and said second vacuum chambers in fluid flow communication;
   a slidable control housing within said housing and having:
   (a) an axial extension which extends through said partition wall into said first power chamber and is directly connected to said first movable wall, and
   (b) ventilating ducts in the form of grooves extending axially through said control housing and connecting said first and said second power chambers;
   an operating rod adapted for connection to a brake pedal of said automotive vehicle and movable within said housing in response to movement of said brake pedal;

valve means within said control housing coupled to said operating rod for controlling fluid flow through said ventilating ducts in response to movement of said operating rod to control passage of atmospheric air into said first and said second power chambers and movement of said control housing by movement of said first movable wall;

a push rod coupled to said control housing and adapted for connection to an actuating piston of a master cylinder to transmit brake power to said master cylinder and a sealing sleeve surrounding said axial extension of said control housing and attached to said axial extension of said control housing with said ventilating ducts defined in a radial direction by said sealing sleeve.

2. A tandem brake power booster according to claim 1 wherein said second movable wall is connected to said sealing sleeve.

3. A tandem brake power booster according to claim 1 wherein said control housing has an annular surface and said sealing sleeve has a collar which is in contact with said annular surface of said control housing.

4. A tandem brake power booster according to claim 1 wherein said axial extension of said control housing has a radial groove and said tandem brake power booster further includes an O-ring fitted between said sealing sleeve and said control housing in said radial groove to seal said sealing sleeve with respect to said control housing.

5. A tandem brake power booster according to claim 1 wherein said fluid flow means include vacuum ducts extending through said control housing and connecting said first and said second vacuum chambers.

6. A tandem brake power booster according to claim 5 wherein said sealing sleeve has a plurality of passages opening into said vaccuum ducts extending through said control housing.

7. A tandem brake power booster according to claim 5 wherein said ventilating ducts are axial passages in said control housing.

8. A tandem brake power booster according to claim 7 wherein said second movable wall has a radially inwardly extending annular surface which is supported axially by said control housing.

9. A tandem brake power booster according to claim 8 wherein said control housing has an annular groove in a surface thereof and said tandem brake power booster further includes a sealing ring in said annular groove to seal said second vacuum chamber with respect to said ventilating ducts.

10. A tandem brake power booster according to claim 9 wherein said control housing has a radial annular surface at its end facing said master cylinder and said tandem brake power booster further includes a return spring which is supported upon said radial annular surface at said end of said control housing facing said master cylinder.

* * * * *